United States Patent
Xiang

(10) Patent No.: US 10,461,344 B2
(45) Date of Patent: Oct. 29, 2019

(54) MULTI-TANK METHANOL-WATER MIXTURE STORAGE SYSTEM OF FUEL CELL VEHICLE

(71) Applicant: GUANGDONG HYDROGEN ENERGY SCIENCE AND TECHNOLOGY CO., LTD, Dongguan (CN)

(72) Inventor: Hua Xiang, Dongguan (CN)

(73) Assignee: GUANGDONG HYDROGEN ENERGY SCIENCE AND TECHNOLOGY CO., LTD., Dongguan (CN)

(*) Notice: Subject to any disclaimer, the term of this patent is extended or adjusted under 35 U.S.C. 154(b) by 415 days.

(21) Appl. No.: 15/444,337

(22) Filed: Feb. 28, 2017

(65) Prior Publication Data
US 2017/0187051 A1    Jun. 29, 2017

Related U.S. Application Data

(63) Continuation of application No. PCT/CN2016/085834, filed on Jun. 15, 2016.

(30) Foreign Application Priority Data

Dec. 23, 2015 (CN) .......................... 2015 1 1007430

(51) Int. Cl.
  *H01M 8/04*     (2016.01)
  *H01M 8/04082*  (2016.01)
  *F17C 5/06*     (2006.01)

(52) U.S. Cl.
  CPC ........... *H01M 8/04201* (2013.01); *F17C 5/06* (2013.01); *F17C 2203/0624* (2013.01);
  (Continued)

(58) Field of Classification Search
  CPC ........... H01M 8/04201; H01M 2250/20; F17C 2203/0624; F17C 2203/0643;
  (Continued)

(56) References Cited

U.S. PATENT DOCUMENTS

| 2011/0147530 A1* | 6/2011 | Rahman ................. B64D 37/02 244/135 C |
| 2011/0286913 A1* | 11/2011 | Lugtigheid ............. C01B 3/065 423/658.2 |
| 2012/0192480 A1* | 8/2012 | Barrett ..................... C10L 3/00 44/300 |

* cited by examiner

*Primary Examiner* — Jane J Rhee
(74) *Attorney, Agent, or Firm* — Wayne & Ken, LLC; Tony Hom

(57) ABSTRACT

The invention discloses a multi-tank methanol-water mixture storage system of a fuel cell vehicle, comprising a main accommodating tank, multiple explosion-proof methanol-water mixture storage tank, bodies are fixedly provided in the main accommodating tank, and the explosion-proof methanol-water mixture storage tank bodies are connected with each other through a delivery channel provided, with a delivery pump; each explosion-proof methanol-water mixture storage tank body is provided with a methanol inlet, a methanol outlet and a vent valve, and all the methanol inlets are connected to a methanol inlet assembly disposed on the main accommodating tank through a liquid path pipeline; the vent valve is disposed on the methanol inlet. The methanol-water mixture storage system of the invention is flameproof and explosion-proof, and does not explode in dangerous situations such as traffic collisions, rollover accidents or military attacks of bullets and bombs, thereby ensuring the safety of people and property on vehicles.

10 Claims, 4 Drawing Sheets

(52) U.S. Cl.
CPC ............ *F17C 2203/0643* (2013.01); *F17C 2203/0646* (2013.01); *F17C 2205/0308* (2013.01); *F17C 2205/0332* (2013.01); *F17C 2205/0352* (2013.01); *F17C 2205/0397* (2013.01); *F17C 2221/033* (2013.01); *F17C 2227/0135* (2013.01); *F17C 2227/041* (2013.01); *F17C 2250/0443* (2013.01); *F17C 2260/042* (2013.01); *F17C 2270/0184* (2013.01); *H01M 2250/20* (2013.01)

(58) Field of Classification Search
CPC ............ F17C 2203/0646; F17C 5/06; F17C 2205/308; F17C 2205/0332; F17C 2205/0352; F17C 2205/0397; F17C 2221/003; F17C 2227/0135; F17C 2227/041; F17C 2250/0443; F17C 2260/042; F17C 2270/0184
See application file for complete search history.

MULTI-TANK METHANOL-WATER MIXTURE STORAGE SYSTEM OF FUEL CELL VEHICLE

CROSS-REFERENCE TO RELATED APPLICATIONS

This application is a continuation of International Patent Application No. PCT/CN2016/085834 with a filing date of Jun. 15, 2016, designating the United States, now pending, and further claims priority to Chinese Patent. Application No. 201511007430.7 with a filing date of Dec. 23, 2015. The content of the aforementioned application, including any intervening amendments thereto, are incorporated herein by reference.

TECHNICAL FIELD

The present invention relates to the field of electric vehicle technology, and more particularly to a multi-tank methanol-water mixture storage system of a fuel cell vehicle and an application method thereof.

BACKGROUND OF THE PRESENT INVENTION

Hydrogen is one of the most desirable energies in the 21st century. Hydrogen produces the most energy during combustion of the same weights of coal, gasoline and hydrogen, and the product obtained from the combustion of them is water without ash and waste gas, and therefore the environment will not be polluted; while the products obtained from the combustion of the coal and petroleum are mainly $CO_2$ and $SO_2$, which may cause greenhouse effect and acid rain. Reserves of oil and coal are limited, but hydrogen mainly exists in water, and the only product obtained from the combustion is also water, so that hydrogen can be generated continuously and will never be used up. Hydrogen is widely distributed, and water is a large "warehouse" of hydrogen and contains 11% of hydrogen. There is about 1.5% hydrogen in the soil; and petroleum, coal, natural gas, animals, plants and the like all contain hydrogen. Hydrogen exists in form of a compound of water, about 70% of the earth's surface is covered with water, and water storage capacity is large; therefore it can be said that hydrogen is an "inexhaustible" energy. If hydrogen can be produced in a suitable way, then hydrogen will also be a relatively cheap energy.

At present, most automobiles use gasoline and diesel as fuel, which not only consume a lot of petroleum resources, but also cause serious air pollution due to automobile exhaust. It becomes very important to develop electric vehicles to address the resource and environmental issues. The electric vehicle refers to a vehicle that is powered by an on-board power source and uses an electric motor to drive wheels to run. The electric vehicle comprises pure electric vehicles, hybrid vehicles and fuel cell vehicles. In the prior art, a fuel cell vehicle refers to an electric vehicle equipped with a fuel cell as a power source for obtaining a driving force. Fuel cells require hydrogen as an electrochemical reaction material during the power generation process of the fuel cells. In the prior art, hydrogen used in a fuel cell is derived from a hydrogen-carrying device or hydrogen production device.

The fuel cell vehicle in the prior art may first generate electricity by using a solar photovoltaic power generation system, then supply electricity to a hydrogen production system to produce hydrogen, store the prepared hydrogen and then supply hydrogen to the fuel cell for power generation, and finally drive an automotive motor to work, where the hydrogen production system is usually an electrolyzed water hydrogen system. Patents relating to this aspect comprise: 1. Chinese, patent literature: CN201310556749.X Energy management system of new type fuel cell hybrid electric vehicle; 2. Chinese patent literature: CN201010126519.6 Clean and sustainable hydrogen for fuel cell vehicle and preparation method thereof; 3. Chinese patent literature: CN201310556851.X Fuel battery and solar energy combined supply type electric vehicle; 4. Chinese patent literature: CN201310583106.4 Solar energy-based automobile-use hydrogen fuel preparation system; 5. CN201410238360.5 Integrated type hydrogen energy preparation, storage and cyclic utilization equipment.

Alternatively, methanol-water mixture may be used to reform the hydrogen production technology to produce hydrogen, and after producing hydrogen, hydrogen production device of methanol-water mixture may supply hydrogen to a fuel cell for generating electricity, so as to drive an automotive motor to work, that is, a hydrogen source is provided to the fuel cell in a manner of instant hydrogen production. An involved patent literature comprises: Chinese invention patent application CN201410845114.6 (Date of application: Dec. 31, 2014; the applicant is the inventor: Guangdong Hydrogen Energy Science and Technology Co., Ltd.) discloses a fuel cell vehicle, which comprises hydrogen production device of methanol-water mixture, a fuel cell and an automotive motor. Methanol is a relatively cheap energy and also a main raw material for producing hydrogen. Therefore, it is a current and future development trend of electric vehicles that fuel cell vehicles use the methanol-water mixture hydrogen production technology.

However, for the above fuel cell vehicles, in terms of fuel storage thereof (one is storage of hydrogen, and the other is storage of fuels), the storage apparatus thereof is a major factor related to vehicle safety just like an existing vehicle fuel tank. In particular, for a fuel cell vehicle using methanol-water mixture to reform hydrogen production technology, the performance of the methanol-water mixture storage device determines the performance of the fuel cell vehicle. In the prior art, for the fuel cell vehicle, the storage apparatus thereof has the following disadvantages: firstly, few fuel cell vehicles are designed with explosion-proof methanol-water mixture storage device; secondly, methanol-water mixture storage device of existing fuel cell vehicles is simple in design, has poor explosion-proof performance, or directly takes a fuel tank structure of motor vehicles. The fuel cell vehicle is prone to explosion accidents in case of situations such as intense collision, shooting or burning, resulting in personal injury of the user of the fuel cell vehicle.

SUMMARY OF PRESENT INVENTION

The technical problem solved by the present invention aims at defects existing in the prior art, a multi-tank methanol-water mixture storage system of a fuel cell vehicle is provided, and the methanol-water mixture storage system may not only effectively ensure convenience and reliability of methanol use and methanol addition, but also does not explode under the dangerous situations such as traffic collisions, rollover accidents or military attacks of bullets and bombs, thereby ensuring the safety of people and property on the vehicle. Meanwhile, the present invention further provides a method using the methanol-water mixture storage system.

To solve the above technical problem, a technical solution of the present invention is as follows: a multi-tank methanol-water mixture storage system of a fuel cell vehicle comprises a main accommodating tank, multiple explosion-proof methanol-water mixture storage tank bodies are fixedly provided in the main accommodating tank, and the explosion-proof methanol-water mixture storage tank bodies are connected with each other through a delivery channel provided with a delivery pump; each explosion-proof methanol-water mixture storage tank body is provided with a methanol inlet, a methanol outlet and a vent valve, the methanol inlet and the explosion-proof methanol-water mixture storage tank body are in form of an integrated structure, and all the methanol inlets are connected, to a methanol inlet assembly disposed on the main accommodating tank through a liquid path pipeline; the vent valve is disposed on the methanol inlet and connected to the inside space of the main accommodating tank and/or a main vent hole disposed on the main accommodating tank through a gas path pipeline; and the methanol outlet is disposed at the bottom of the explosion-proof methanol-water mixture storage tank body and connected to hydrogen production device of the fuel cell vehicle through a pipeline, where the pipeline is provided with a multi-way valve, and the multi-way valve is connected to each methanol outlet assembly to output methanol-water mixture.

As a further illustration of the above technical solution:

In the above technical solution the explosion-proof methanol-water mixture storage tank body comprises a tank body housing, multiple explosion-proof layers and a tank body inner container, where the multiple explosion-proof layers are located on an interlayer formed between the tank body housing and the tank body inner container, the multiple explosion-proof layers and the tank body inner container are covered by the tank body housing, and the tank body inner container is connected with the methanol inlet; the multiple explosion-proof layers comprise a stiffened plate, layer, a high-strength rubber layer, an explosion-proof agent filling layer, an explosion suppression material filling layer and a protective net layer that are successively arranged, and the stiffened plate layer is used to connect the tank body inner container and the tank body housing; and the tank body inner container is served as a storage space for methanol-water mixture, and the interior thereof is coated with a methanol corrosion resistant layer.

Further, the protective net layer is a strip-shaped blocking explosion-proof aluminum foil net or a spherical blocking explosion-proof aluminum foil net or a coiled blocking explosion-proof aluminum foil net, and a thickness of the blocking explosion-proof aluminum foil net is 0.015-0.025 mm.

Further, the tank body inner container is a stainless steel tank body inner container, and the interior thereof is coated with a methanol corrosion resistant agent.

Further, the protective net layer is a protective net formed by braiding t least one strand of flame-retardant nylon.

Further, the explosion suppression material filling layer is filled with an aluminum alloy explosion suppression material and/or a porous foam metal material.

Further, the explosion-proof agent filling layer and the explosion suppression material filling layer are further vacuum filling layers, and the explosion-proof agent filling layer and the explosion suppression material filling layer are respectively filled with an explosion-proof agent and an explosion suppression material respectively, and then a vacuum explosion-proof buffer layer is formed through vacuumizing.

In the above technical solution, a sealed cap is disposed on the upper end of the methanol inlet assembly, and a pressure reducing valve is further disposed on the sealed cap.

In the above technical solution, the main accommodating tank is a steel-plate main accommodating tank, the explosion-proof methanol-water mixture storage tank body is fastened to the main accommodating tank through welding, and explosion-proof agents are further filled in gaps between the main accommodating tank and the explosion-proof methanol-water mixture storage tank bodies and among the explosion-proof methanol-water mixture storage tank bodies.

In the above technical solution, the multi-way valve is further provided with a flow meter, and opens valves of a matching quantity according to a methanol-water mixture flow measured by the flow meter; and the output end of the multi-way valve is further provided with a delivery pump through which methanol-water mixture output integratedly is delivered to the hydrogen production device of the fuel cell vehicle.

A method using the above multi-tank methanol-water mixture storage system of a fuel cell vehicle comprises the following steps:

step A: selecting one of the multiple explosion-proof methanol-water mixture storage tank bodies as a main methanol supply tank body when the methanol-water mixture storage system supplies methanol to the fuel cell vehicle; opening matched valves through the multi-way valve, so that methanol-water mixture in the main methanol supply tank body is delivered to the hydrogen production device of the fuel-cell vehicle along the pipeline through the delivery pumps; and when the amount of methanol-water mixture in the main methanol supply tank body is decreased or used up, opening the delivery pumps located on the delivery channels among the explosion-proof methanol-water mixture storage tank bodies to deliver methanol-water mixture to the main methanol supply tank body, and making the main methanol supply tank body continue to deliver methanol-water mixture; alternatively, switching opening/cloying the corresponding valves of the multi-way valve to switch other explosion-proof methanol-water mixture storage tank bodies storing methanol-water mixture to be the main methanol supply tank body, and making the switched main methanol supply tank body supply methanol to the hydrogen production device of the fuel cell vehicle; in this way, until methanol-water mixture in all the explosion-proof methanol-water mixture storage tank bodies are used up; a negative pressure is formed in the main methanol supply tank body in the process of consumption or exhaustion of methanol-water mixture, and under the suction action of the negative pressure, air in other explosion-proof methanol water mixture storage tank bodies enters the main explosion-proof methanol-water mixture storage tank body through intercommunicated vent valves, to ensure pressures in all the explosion-proof methanol-water mixture storage tank bodies are the same; and when a total negative pressure in the entire methanol-water mixture storage system reaches a specified value, automatically opening the vent valves of all the explosion-proof methanol-water mixture storage tank bodies under the action of negative pressures, so that a pressure of the entire methanol-water mixture storage system is always maintained in a certain range, and smooth methanol supply is guaranteed;

step B: opening the methanol inlet assembly when methanol is injected into the methanol-water mixture storage system, and providing the following two modes of methanol injection:

mold 1: injecting methanol-water mixture through the liquid path channel of the methanol inlet matched with any one of the explosion-proof methanol-water mixture storage tank bodies; when the explosion-proof methanol-water mixture storage tank body bodies are full of methanol-water mixture, opening the delivery pumps among the explosion-proof methanol-water mixture storage tank bodies communicated therewith, and delivering the methanol-water mixture in the explosion-proof methanol-water mixture storage tank body to the other explosion-proof methanol-water mixture storage tank bodies;

mode 2: directly injecting methanol-water mixture to all the explosion-proof methanol-water mixture storage tank bodies one by one by the methanol inlet assembly through the liquid path channels, positive pressures are formed in the explosion-proof methanol-water mixture storage tank bodies in which the methanol-water mixture is injected respectively in the process of methanol-water mixture injection under the action of positive pressures, air in the explosion-proof methanol-water mixture storage tank bodies in which the methanol-water mixture is injected respectively is discharged into atmosphere or an explosion-proof methanol-water mixture storage tank bodies in which the methanol-water mixture is being injected respectively through the liquid path channels of corresponding methanol inlets or the delivery channels, and is finally discharged through liquid path channels of methanol inlets of all the explosion-proof methanol-water mixture storage tank bodies in which methanol-water mixture is injected respectively, so that air in all the explosion-proof methanol-water mixture storage tank bodies can be discharged smoothly, and all the explosion-proof methanol-water mixture storage tank bodies can be filled with methanol-water mixture smoothly; and tightening the sealed cap on the main accommodating tank after methanol injection is completed.

Compared with the prior art, the present invention has the following beneficial effects: firstly, the methanol-water mixture storage system of the present invention fills the vacancy that a fuel cell vehicle adopting methanol-water mixture as a raw material has no explosion-proof storage system, and the safety performance of the fuel cell vehicle is improved. Secondly, the tank bodies reserving or storing methanol-water mixture have explosion-proof performance by being provided with composite explosion-proof layers and do not explode under the dangerous situations such as traffic collisions, rollover accidents or military attacks of bullets and bombs, thereby ensuring the safety of people and property on the vehicle. Thirdly, the storage system of the present invention has large methanol storage capacity and can effectively ensure the convenience and reliability of methanol use and methanol addition.

Figure 1:
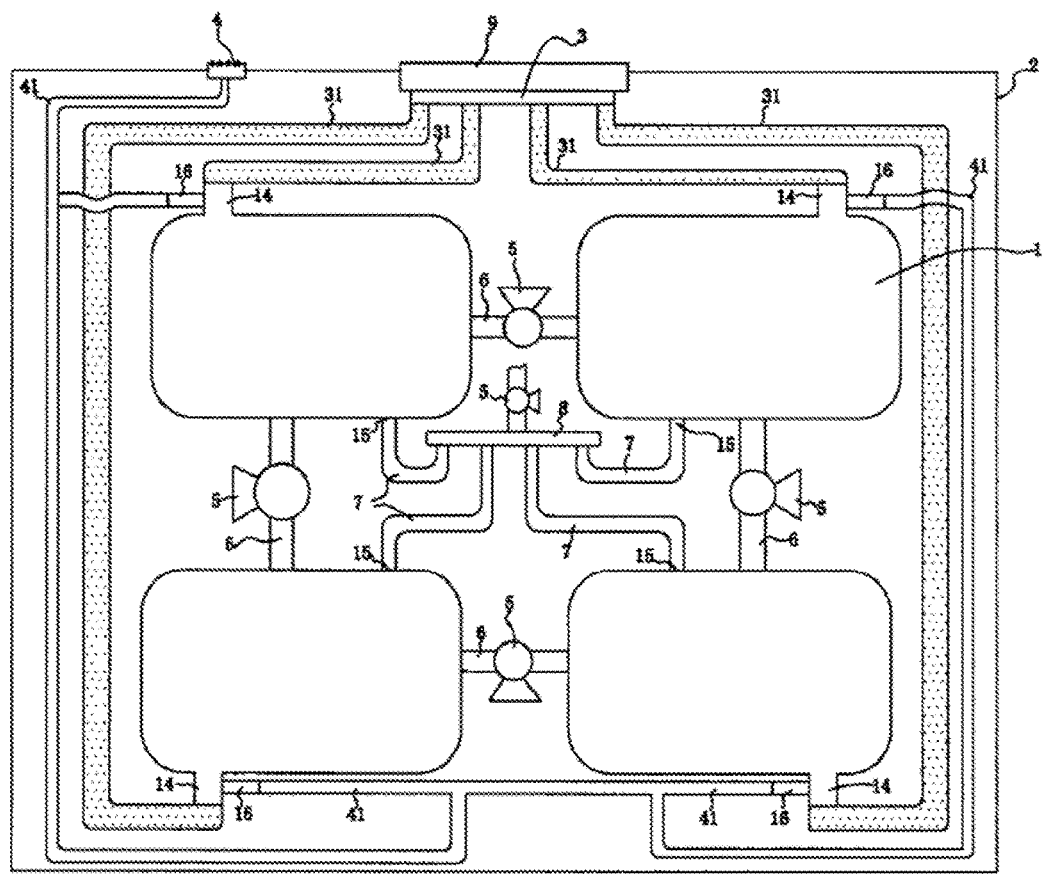
FIG. 1 is a schematic diagram of Embodiment 1 of a methanol-water mixture storage system according to the present invention.

In the FIG. 1. explosion-proof methanol-water mixture storage tank body, 2. main accommodating tank, 3. methanol inlet assembly, 4. main vent hole, 5. delivery pump, 6. delivery pipeline, 7. pipeline, 8. multi-way valve, 9. sealed cap. 11. tank body housing, 12. explosion-proof layer, 13. tank body inner container. 14. methanol inlet, 15. methanol outlet, 16. vent valve, 31. liquid path pipeline, 41. gas path pipeline, 121. stiffened plate layer, 122. high-strength rubber layer, 123. explosion-proof agent filling layer, 124. explosion suppression material filling layer, 125. protective net layer.

DETAILED DESCRIPTION OF PREFERRED EMBODIMENTS

The present invention will be explained in detail with reference to the attached drawings.

Figure 3:
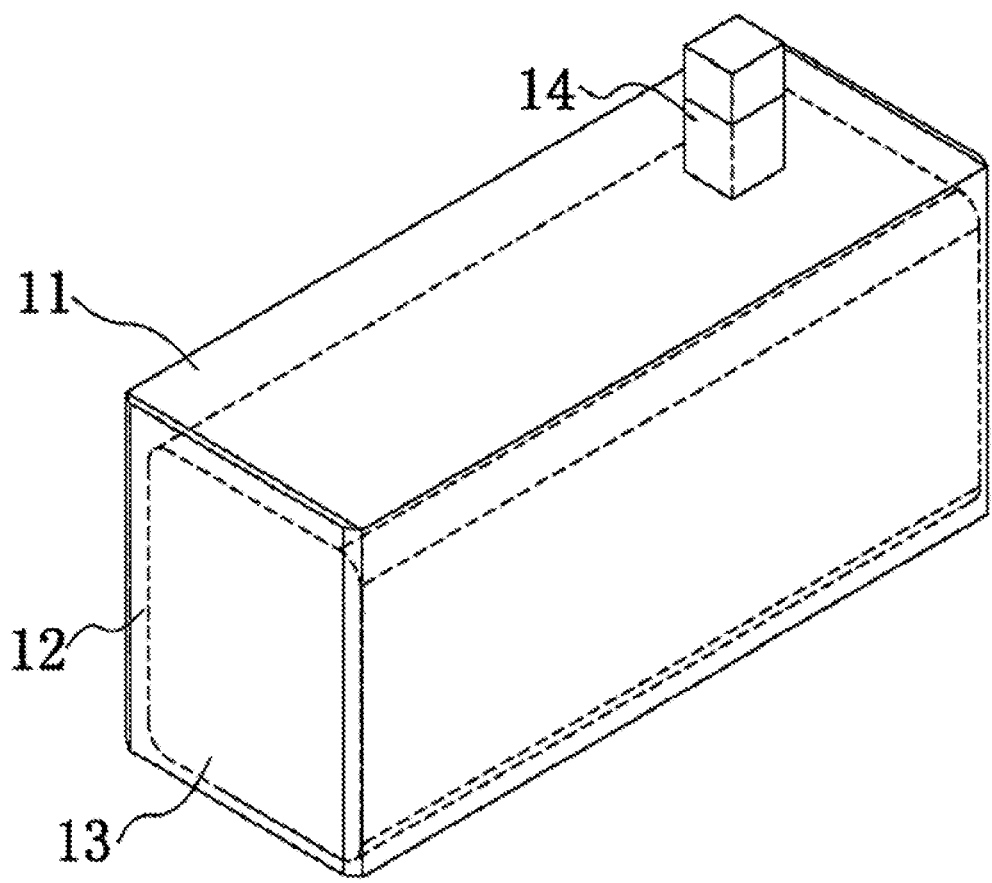
FIG. 3 is a schematic structural diagram of an explosion-proof methanol-water mixture storage tank body according to the present invention.
Figure 4:
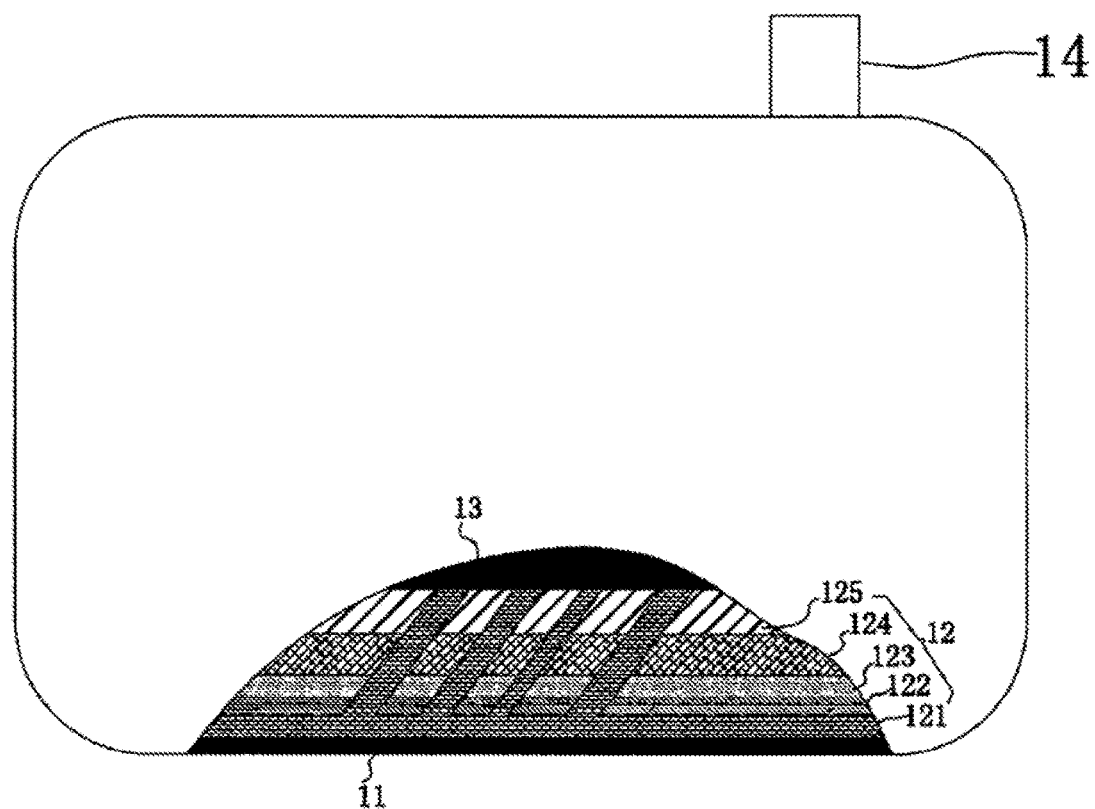
FIG. 4 is a side view of a methanol-water mixture storage device and a schematic diagram of an explosion-proof layer thereof according to the present invention.

Embodiment 1: referring to FIG. 1 and FIGS. 3-4, a multi-tank methanol-water mixture storage system of a fuel cell vehicle comprises a main accommodating tank 2, four explosion-proof methanol-water mixture storage tank bodies 1 are fixedly arranged in the main accommodating tank 2, and the four explosion-proof methanol-water mixture storage tank bodies 1 are communicated with each other through delivery channels 6 provided with delivery pumps 5; wherein, each of the explosion-proof methanol-water mixture storage tank bodies 1 is provided with a methanol inlet 14, a methanol outlet 15 and a vent valve 16, the methanol inlet 14 and the corresponding explosion-proof methanol-water mixture storage tank body 1 form an integrated structure, and all the methanol inlets 14 are connected to a methanol inlet 14 assembly 3 disposed on the main accommodating tank 2 through liquid path pipelines 31; the vent valve 16 is arranged on the methanol inlet 14 and is communicated to the space of the main accommodating tank 2 and/or a main vent hole 4 formed in the main, accommodating tank 2 (It's needed to note that the methanol inlet 14 assembly 3 and the main vent hole 4 are arranged at the upper end of the main accommodating tank 2, and their arrangement mode and trajectory strokes of the liquid path pipelines 31 and gas path pipelines 41 are not shown in Figures); the methanol, outlets 15 are disposed at the bottoms of the explosion-proof methanol-water mixture storage tank bodies 1 and connected to a hydrogen production device of the fuel cell vehicle through a pipeline, the pipeline 7 is provided with a multi-way valve 8, and the multi-way valve 8 is connected to each methanol outlet 15 to integrally output methanol-water mixture. A flow meter (not shown in Figures) is further arranged at the multi-way valve 8, and the multi-way valve 8 opens a etched number of valves according to the methanol-water mixture flow measured by the flow meter; a delivery pump 5 is further arranged at the output end of the multi-way valve 8 and delivers the methanol-water mixture output integrally to the hydrogen production device of the fuel cell vehicle. A sealed cap 9 is further arranged at the upper end of the methanol inlet 14 assembly 3. and a pressure reducing valve is further disposed on the sealed cap 9, Specially, the main accommodating tank 2 is a steel-plate main accommodating tank 2, the explosion-proof methanol-water mixture storage tank bodies 1 are fastened to the main accommodating tank 2 through welding, and explosion-proof agents are further filled in gaps between the main accommodating tank 2 and the explosion-proof methanol-water mixture storage tank bodies 1 and gaps among the explosion-proof methanol-water mixture storage tank bodies 1.

Referring to FIGS. 3-4, wherein each of the explosion-proof methanol-water mixture storage tank bodies 1 comprises a tank body housing 11, a plurality of explosion-proof layers 12 and a tank body inner container 13, the multiple explosion-proof layers 12 are located on an interlayer formed between the tank body housing 11 and the tank body inner container 13, the tank body housing 11 wraps the multiple explosion-proof layers 12 and the tank body inner container 13, and the tank body inner container 13 are communicated with the methanol inlets 14; the multiple explosion-proof layers 12 comprise a stiffened plate layer 121, a high-strength rubber layer 122, an explosion-proof agent filling layer 123, an explosion suppression material filling layer 124 and a protective net layer 125 that are successively arranged, and the stiffened plate layer 121 is used for connecting the tank body inner container 13 and the tank body housing 11; The tank body inner container 13 is a methanol-water mixture storage space, the inner side of the tank body inner container 13 is coated with methanol corrosion resistant layer (not shown in Figures) the tank body inner container 13 is a stainless steel tank body inner container 13, and the inner surface of the tank body inner container 13 is coated with a methanol corrosion resistant agent. The service life of the tank body inner container 133 of each of the explosion-proof methanol-water mixture storage tank bodies 1 can be prolonged through the methanol corrosion resistant layer/methanol corrosion resistant agent, accordingly the service life periods of the storage system and the fuel cell vehicle are prolonged, it is ensured that stored methanol-water mixture is clean, and thus the hydrogen production device of the fuel cell vehicle performs efficient hydrogen production. It is needed to note that the arrangement sequence of the multiple explosion-proof layers 122 can be changed in design as required, namely in practice, the arrangement according to the sequence of the stiffened plate layer 121, the high-strength rubber layer 122, the explosion-proof agent filling layer 123, the explosion suppression material filling layer 124 and the protective net layer 125 of the explosion-proof layers 12 is not limited. Preferably, the protective net layer 125 is a strip-shaped blocking explosion-proof aluminum foil net or a spherical blocking explosion-proof aluminum foil net or a coiled blocking explosion-proof aluminum foil net, and the thickness of the blocking explosion-proof aluminum foil net is 0.015-0.025 mm. Wherein, the protective net layer 125 can be a protective net formed by braiding at least one, strand of flame-retardant nylon. While the explosion suppression material filling layer 124 is filled with an aluminum alloy explosion suppression material and/or a porous foam metal material. The explosion-proof agent filling layer 123 and the explosion suppression material filling layer 124 are further vacuum filling layers, and the explosion-proof agent filling layer 123 and the explosion suppression material filling layer 124 are respectively filled with an explosion-proof agent and an explosion suppression material respectively, and then a vacuum explosion-proof buffer layer is formed through vacuumizing.

Figure 2:
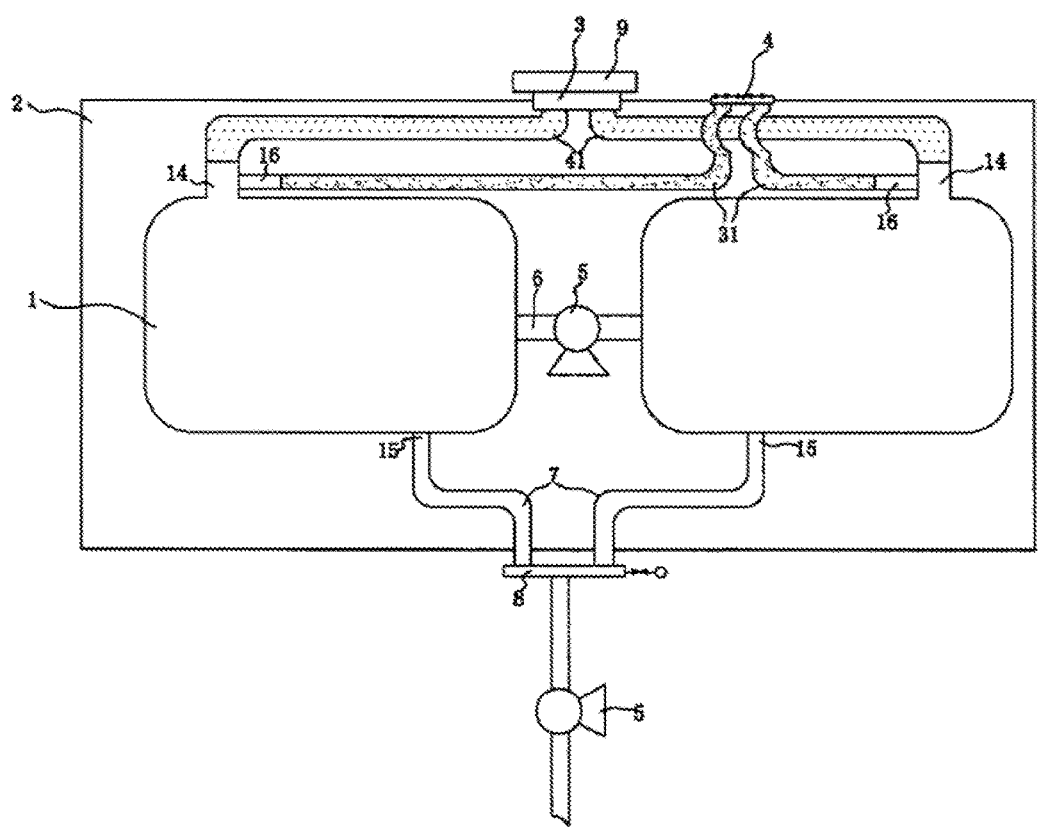
FIG. 2 is a schematic diagram of Embodiment 2 of a ethanol-water mixture storage system according to the present invention.

Embodiment II: referring FIGS. 2-4, a multi-tank methanol-water mixture storage system of a fuel cell vehicle comprises a main accommodating tank 2, two parallelly-arranged explosion-proof methanol-water mixture storage tank bodies 1 are fixedly arranged in the main accommodating tank 2 through welding, and the two explosion-proof methanol-water mixture storage tank bodies 1 are communicated with each other through delivery channels 6 provided with delivery pumps 5; wherein each of the explosion-proof methanol-water mixture storage tank bodies 1 is provided with a methanol inlet 14, a methanol outlet 15 and a vent valve 16, the methanol inlet 14 and the corresponding explosion-proof methanol-water mixture storage tank body 1 form an integrated structure, and all the methanol inlets 14 are connected to a methanol inlet 14 assembly 3 disposed on the main accommodating tank 2 through liquid path pipelines 31; the vent valve 16 is arranged on the methanol inlet 14 and is communicated to the space of the main accommodating tank 2 and/or a main vent hole 4 formed in the main accommodating tank 2 (It's needed to note that the methanol inlet 14 assembly 3 and the main vent hole 4 are arranged at the upper end of the main accommodating tank 2, and their arrangement mode and trajectory strokes of the liquid path pipelines 31 and, gas path pipelines 41 are not shown in Figures); the methanol outlets 15 are disposed at the bottoms of the explosion-proof methanol-water mixture storage tank bodies 1 and connected to a hydrogen production device of the fuel cell vehicle through a pipeline 7, the pipeline 7 is provided with a multi-way valve 8, and the, multi-way valve 8 is connected to each methanol outlet 15 to integrally output methanol-water mixture. A flow meter (not shown in Figures) is further arranged at the multi-way valve 8, and the multi-way valve 8 opens a matched number of valves according to the methanol-water mixture flow measured by the flow meter; a delivery pump 5 is further arranged at the output end of the multi-way valve 8 and delivers the methanol-water mixture output integrally to the hydrogen production device of the fuel cell vehicle. A sealed cap 9 is further arranged at the upper end of the methanol inlet 14 assembly 3, and a pressure reducing valve is further disposed on the sealed cap 9. Specially, the main accommodating tank 2 is a steel-plate main accommodating tank 2, and explosion-proof agents are further filled in gaps between the main accommodating tank 2 and the explosion-proof methanol-water mixture storage tank bodies 1 and gaps among the explosion-proof methanol-water mixture storage tank bodies 1.

Referring to FIGS. 3-4, wherein each of the two explosion-proof methanol-water mixture storage tank bodies 1 comprises a tank body housing 11, a plurality of explosion-proof layers 12 and a tank body inner container 13, the multiple explosion-proof layers 12 are located on an interlayer formed between the tank body housing 11 and the tank body inner container 13, the tank body housing 11 wraps the multiple explosion-proof layers 12 and the tank body inner container 13, and the tank body inner container 13 are communicated with the methanol inlets 14; the multiple explosion-proof layers 12 comprise a stiffened plate layer 121, a high-strength rubber layer 122, an explosion-proof agent filling layer 123, an explosion suppression material filling layer 124 and a protective net layer 125 that are successively arranged, and the stiffened plate layer 121 is used for connecting the tank body inner container 13 and the tank body housing 11; The tank body inner container 13 is a methanol-water mixture storage space, the inner side of the tank body inner container 13 is coated with a methanol corrosion resistant layer (not shown in Figures), the tank body inner container 13 is a stainless steel tank body inner container 13, and the inner surface of the tank body inner container 13 is coated with a methanol corrosion resistant agent. The service life of the tank body inner container 133 of each of the explosion-proof methanol-water mixture storage tank bodies 1 can be prolonged through the methanol corrosion resistant layer/methanol corrosion resistant agent, accordingly the life periods of the storage system and the fuel cell vehicle are prolonged, it is ensured that stored methanol-water mixture is clean, and thus the hydrogen production device of the fuel cell vehicle performs efficient hydrogen production. It is needed to note that the arrangement sequence of the multiple explosion-proof layers 122 can be changed in design as required, namely in practice, the arrangement according to the sequence of the stiffened plate layer 121, the high-strength rubber layer 122, the explosion-proof agent filling layer 123, the explosion suppression material filling layer 124 and the protective net layer 125 of the explosion-proof layers 122 is not limited. Preferably, the protective net layer 125 is a strip-shaped blocking explosion-proof aluminum foil net or a spherical blocking explosion-proof aluminum foil net or a coiled blocking explosion-proof aluminum foil net, and the thickness of the blocking explosion-proof aluminum foil net is 0.015-0.025 mm. Wherein, the protective net layer 125 can be a protective net formed by braiding at least one strand of flame-retardant nylon. While the explosion suppression material filling layer 124 is filled with an aluminum alloy explosion suppression material and/or a porous foam metal material. The explosion-proof agent filling layer 123 and the explosion suppression material filling layer 124 are further vacuum filling layers, and the explosion-proof agent filling layer 123 and the explosion suppression material filling layer 124 are respectively filled with an explosion-proof agent and an explosion suppression material respectively, and then a vacuum explosion-proof buffer layer is formed through vacuumizing. It is needed to note that in practice, the number of the explosion-proof methanol-water mixture storage tank bodies 1 can be selected according to the demand the shape and size of the main accommodating tank 2.

A method of using the multi-tank methanol-water mixture storage system of the fuel cell vehicle in the above two embodiments comprises the following steps:

step A, selecting one of the multiple explosion-proof methanol-water mixture storage tank bodies 1 as a main methanol supply tank body when the methanol-water mixture storage system supplies methanol to the fuel cell vehicle, and opening matched valves through the multi-way valve 8, so that methanol-water mixture in the main methanol supply tank body is delivered to the hydrogen production device of the fuel-cell vehicle along the pipeline 7 through the delivery pumps 5; when the amount of the methanol-water mixture in the main methanol supply tank body is decreased or used up, opening the delivery pumps 5 located on the delivery channels 6 among the explosion-proof methanol-water mixture storage tank bodies 1 to deliver methanol-water mixture to the main methanol supply tank body, and making the main methanol supply tank body continue to deliver methanol-water mixture; alternatively, switching opening/closing the corresponding valves of the multi-way valve 8 to switch other explosion-proof methanol-water mixture storage tank bodies 1 storing methanol-water mixture to be the main methanol supply tank body, and making the switched main methanol supply tank body supply methanol to the hydrogen production device of the fuel cell vehicle; in this way, until the methanol-water mixture in all the explosion-proof methanol-water mixture storage tank bodies 1 is used up; a negative pressure, is formed in the main methanol supply tank body in the process of consumption or exhaustion of methanol-water mixture, and under the suction action of the negative pressure, air in other explosion-proof methanol-water mixture storage tank bodies 1 enters the main explosion-proof methanol-water mixture storage tank body 1 through intercommunicated vent valves 16, to ensure that pressures in all the explosion-proof methanol-water mixture storage tank bodies 1 are the same, and when a total negative pressure in the entire methanol-water mixture storage system reaches a specified value, automatically opening the vent valves 16 of all the explosion-proof methanol-water mixture storage tank bodies 1 under the action of negative pressures, so that the pressure of the entire methanol-water mixture storage system is always maintained in a certain range, and smooth methanol supply is guaranteed;

step B, opening the methanol inlet 14 assembly 3 when methanol is injected into the methanol-water mixture storage system, and providing the following two modes of methanol injection:

mode 1: injecting methanol-water mixture through the liquid path channel of the methanol inlet 14 matched with any one of the explosion-proof methanol-water mixture storage tank bodies 1; when the explosion-proof methanol-water mixture storage tank bodies 1 are full of methanol-water mixture, opening the delivery pumps among other explosion-proof methanol-water mixture storage tank bodies 1 communicated therewith, and delivering the methanol-water mixture in the explosion-proof methanol-water mixture storage tank body 1 to the other explosion-proof methanol-water mixture storage tank bodies 1;

mode 2: directly injecting methanol-water mixture to all the explosion-proof methanol-water mixture storage tank bodies 1 one by one by the methanol inlet 14 assembly 3 through the liquid path channels;

positive pressures are formed in the explosion-proof methanol-water mixture storage tank bodies 1 in which the methanol-water mixture is injected respectively in the process of methanol-water mixture injection, under the action of positive pressures, air in the explosion-proof methanol-water mixture storage tank bodies 2 in which the methanol-water mixture is injected respectively is discharged into atmosphere or an explosion-proof methanol-water mixture storage tank bodies 1 in which the methanol-water mixture is being injected respectively through the liquid path channels of corresponding methanol inlets 14 or the delivery channels 6 and is finally discharged through the liquid path channels of the methanol inlets 14 of all the explosion-proof methanol-water mixture storage tank bodies 1 in which methanol-water mixture is injected respectively, so that the air in all the explosion-proof methanol-water mixture storage tank bodies 1 can be discharged smoothly and all the explosion-proof methanol-water mixture storage tank bodies 1 can be filled with methanol-water mixture smoothly; and tightening the sealed cap 9 on the main accommodating tank 2 after methanol injection is completed.

The methanol-water mixture storage system of the, present invention fills the vacancy that a fuel cell vehicle adopting methanol-water mixture as a raw material has no explosion-proof storage, system, and the safety performance of the fuel cell vehicle is improved. The tank bodies reserving or storing methanol-water mixture have explosion-proof performance by being provided with composite explosion-proof layers and do not explode under the dangerous situations such as traffic collisions, rollover accidents or military attacks of bullets and bombs, thereby ensuring the safety of people and property on the vehicle. Meanwhile, the storage system of the present invention has large methanol storage capacity and can effectively ensure the convenience and reliability of methanol use and methanol addition.

The technical, scope of the present invention is not limited to the above description, any modification, equivalent change or amendment employed on the above embodiments according to the technical substance of the present invention still belongs to the scope of the technical scheme of the present invention.

I claim:

1. A multi-tank methanol-water mixture storage system of a fuel cell vehicle, characterized by comprising a main accommodating tank, wherein the main accommodating tank is fixedly provided with multiple explosion-proof methanol-water mixture storage tank bodies, and the explosion-proof methanol-water mixture storage tank bodies are connected with each other through a delivery channel provided with a delivery pump; each explosion-proof methanol-water mixture storage tank body is provided with a methanol inlet, a methanol outlet and a vent valve, the methanol inlet and the explosion-proof methanol-water mixture storage tank body are in form of an integrated structure, and all the methanol inlets are connected to a methanol inlet assembly disposed on the main accommodating tank through a liquid path pipeline; the vent valve is disposed on the methanol inlet and connected to the inside space of the main accommodating tank and/or a main vent hole disposed on the main accommodating tank through a gas path pipeline; and the methanol outlet is disposed at the bottom of the explosion-proof methanol-water mixture storage tank body and connected to hydrogen production device of the fuel cell vehicle through a pipeline, wherein the pipeline is provided with a multi-way valve, and the multi-way valve is connected to each methanol outlet assembly to output methanol-water mixture.

2. The multi-tank methanol-water mixture storage system of a fuel cell vehicle, according to claim 1, characterized in that the explosion-proof methanol-water mixture storage tank body comprises a tank body housing, multiple explosion-proof layers and a tank body inner container, wherein the multiple explosion-proof layers are located on an interlayer formed between the tank body housing and the tank body inner container, the multiple explosion-proof layers and the tank body inner container are covered by the tank body housing, and the tank body inner container is connected with the methanol inlet; the multiple explosion-proof layers comprise a stiffened plate layer, a high-strength rubber layer, an explosion-proof agent filling layer, an explosion suppression material filling layer and a protective net layer that are successively arranged, and the stiffened plate layer is used to connect the tank body inner container and the tank body housing; and the tank body inner container is served as a storage space for methanol-water mixture, and the interior thereof is coated with a methanol corrosion resistant layer.

3. The multi-tank methanol-water mixture storage system of a fuel cell vehicle according to claim 2, characterized in that the protective net layer is a strip-shaped blocking explosion-proof aluminum foil net or a spherical blocking explosion-proof aluminum foil net or a coiled blocking explosion-proof aluminum foil net, and a thickness of the blocking explosion-proof aluminum foil net is 0.015-0.025 mm.

4. The multi-tank methanol-water mixture storage system of a fuel cell vehicle according to claim 2, characterized in that the tank body inner container is a stainless steel tank body inner container, and the interior thereof is coated with a methanol corrosion resistant agent.

5. The multi-tank methanol-water mixture storage system of a fuel cell vehicle according to claim 2, characterized in that the explosion suppression material filling layer is filled with an aluminum alloy explosion suppression material and/or a porous foam metal material.

6. The multi-tank methanol-water mixture storage system of a fuel cell vehicle according to claim 2, characterized in that the explosion-proof agent filling layer and the explosion suppression material filling layer are further vacuum filling layers, and the explosion-proof agent filling layer and the explosion suppression material filling layer are respectively filled with an explosion-proof agent and an explosion suppression material respectively, and then a vacuum explosion-proof buffer layer is formed through vacuumizing.

7. The multi-tank methanol-water mixture storage system of a fuel cell vehicle according to claim 1, characterized in that a sealed cap is disposed on the upper end of the methanol inlet assembly, and a pressure reducing valve is further disposed on the sealed cap.

8. The multi-tank methanol-water mixture storage system of a fuel cell vehicle according to claim 1, characterized in that the main accommodating tank is a steel-plate main accommodating tank, the explosion-proof methanol-water mixture storage tank body is fastened to the main accommodating tank through welding, and explosion-proof agents are further filled in gaps between the main accommodating tank and the explosion-proof methanol-water mixture storage tank bodies and among the explosion-proof methanol-water mixture storage tank bodies.

9. The multi-tank methanol-water mixture storage system of a fuel cell vehicle according to claim 1, characterized in that the multi-way valve, is further provided with a flow meter, and opens valves of a matching quantity according to a methanol-water mixture flow measured by the flow meter; and the output end of the multi-way valve is further provided with a delivery pump through which methanol-water mixture output integratedly is delivered to the hydrogen production device of the fuel cell vehicle.

10. A method of using the multi-tank methanol-water mixture storage system of a fuel cell vehicle according to claim 1, characterized by comprising the following steps:

step A: selecting one of the multiple explosion-proof methanol-water mixture storage tank bodies as a main methanol supply tank body when the methanol-water mixture storage system supplies methanol to the fuel cell vehicle;

opening matched valves through the multi-way valve, so that methanol-water mixture in the main methanol supply tank body is delivered to the hydrogen production device of the fuel cell vehicle along the pipeline through the delivery pumps; when the amount of methanol-water mixture in the main methanol supply tank body is decreased or used up, opening the delivery pumps located on the delivery channels among the explosion-proof methanol-water mixture storage tank bodies to deliver methanol-water mixture to the main methanol supply tank body, and making the main methanol supply tank body continue to deliver methanol-water mixture;

alternatively, switching opening/closing the corresponding valves of the multi-way valve to switch other explosion-proof methanol-water mixture storage tank bodies storing methanol-water mixture to be the main methanol supply tank body, and making the switched main methanol supply tank body supply methanol to the hydrogen production device of the fuel cell vehicle;

in this way, until methanol-water mixture in all the explosion proof methanol-water mixture storage tank bodies are used up; wherein a negative pressure is formed in the main methanol supply tank body in the process of consumption or exhaustion of methanol-water mixture under the suction action of the negative pressure, air in other explosion-proof methanol-water mixture storage tank bodies enters the main explosion-proof methanol-water mixture storage tank body through intercommunicated vent valves to ensure pressures in all the explosion-proof methanol-water mixture storage tank bodies are the same; and when a total negative pressure in the entire methanol-water mixture storage system reaches a specified value, automatically opening the vent valves of all the explosion-proof methanol-water mixture storage tank bodies under the action of negative pressures so that a pressure of the entire methanol-water mixture storage system is always maintained in a certain range, and smooth methanol supply is guaranteed;

step B: opening the methanol inlet assembly when methanol is injected into the methanol-water mixture storage system, and providing the following two modes of methanol injection:

mold 1: injecting methanol-water mixture through the liquid path channel of the methanol inlet matched with any one of the explosion-proof methanol-water mixture storage tank bodies; when the explosion-proof methanol-water mixture storage tank body bodies are full of methanol-water mixture, opening the delivery pumps among other explosion-proof methanol-water mixture storage tank bodies communicated therewith, and delivering the methanol-water mixture in the explosion-proof methanol-water mixture storage tank body to the other explosion-proof methanol-water mixture storage tank bodies;

mode 2: directly injecting methanol-water mixture to all the explosion-proof methanol-water mixture storage tank bodies one by one by the methanol inlet assembly through the liquid path channels positive pressures are formed in the explosion-proof methanol-water mixture storage tank bodies, in which the methanol-water mixture is injected respectively in the process of methanol-water mixture injection, under the action of positive pressures, air in the explosion-proof methanol-water mixture storage tank bodies in which the methanol-water mixture is injected respectively is discharged into atmosphere or an explosion-proof methanol-water mixture storage tank bodies in which the methanol-water mixture is being injected respectively through the liquid path channels of corresponding methanol inlets or the delivery channels, and is finally discharged through liquid path channels of methanol inlets of all the explosion-proof methanol-water mixture storage tank bodies in which methanol-water mixture is injected respectively, so that air in all the explosion-proof methanol-water mixture storage tank bodies can be discharged smoothly, and all the explosion-proof methanol-water mixture storage tank bodies can be filled with methanol-water mixture smoothly; and tightening the sealed cap after methanol injection is completed.

* * * * *